United States Patent
Sherwin

(10) Patent No.: US 7,575,089 B2
(45) Date of Patent: Aug. 18, 2009

(54) STEERING APPARATUS

(75) Inventor: Kenneth A. Sherwin, West Lafayette, IN (US)

(73) Assignee: TRW Automotive U.S. LLC, Mulberry, IN (US)

( * ) Notice: Subject to any disclaimer, the term of this patent is extended or adjusted under 35 U.S.C. 154(b) by 342 days.

(21) Appl. No.: 11/293,429

(22) Filed: Dec. 2, 2005

(65) Prior Publication Data

US 2007/0144818 A1    Jun. 28, 2007

(51) Int. Cl.
*B62D 7/06* (2006.01)
*B60T 8/00* (2006.01)

(52) U.S. Cl. .................... 180/411; 303/112; 303/189; 303/142; 303/140; 303/146; 701/71; 701/72

(58) Field of Classification Search .......... 303/112, 303/189, 142, 140, 146; 180/411; 701/71, 701/72
See application file for complete search history.

(56) References Cited

U.S. PATENT DOCUMENTS

| | | | |
|---|---|---|---|
| 3,877,537 A | 4/1975 | Ohms et al. | |
| 5,238,077 A | 8/1993 | Vaughn et al. | |
| 6,131,688 A * | 10/2000 | Fukada | 180/408 |
| 6,735,510 B2 * | 5/2004 | Hac | 701/70 |
| 6,856,877 B2 * | 2/2005 | Coelingh et al. | 701/48 |
| 6,945,350 B2 | 9/2005 | Szabela et al. | |
| 6,968,262 B2 * | 11/2005 | Higashi et al. | 701/41 |
| 7,164,980 B1 * | 1/2007 | Doll et al. | 701/48 |
| 7,315,777 B2 * | 1/2008 | Ono | 701/70 |
| 2002/0030407 A1 * | 3/2002 | Nishizaki et al. | 303/146 |

* cited by examiner

*Primary Examiner*—Paul N Dickson
*Assistant Examiner*—Marlon A Arce
(74) *Attorney, Agent, or Firm*—Tarolli, Sundheim, Covell & Tummino LLP

(57) ABSTRACT

A front steering gear (18) is connected with steerable front wheels (12 and 14) of a vehicle (10). A rear steering gear (28) is connected with steerable rear wheels (30 and 32) of the vehicle (10). A torque sensor (40) connected with a steering wheel (16) provides an output to a controller (42). The controller (42) effects operation of the rear steering gear (28) in response to an output of the torque sensor (40) corresponding to manual application of at least a predetermined force to the steering wheel (16). Alternatively or in addition, the controller (42) may effect operation of a rear wheel brake (50 or 52) which is disposed on a radially inner side of a turn in response to the output from the torque sensor (40).

15 Claims, 1 Drawing Sheet

STEERING APPARATUS

BACKGROUND OF THE INVENTION

The present invention relates to a vehicle steering apparatus.

A known vehicle steering apparatus includes a front steering gear which is connected with steerable front wheels of a vehicle. In addition, two rear steering gears are connected with steerable rear wheels of the vehicle. A position sensor determines the steering position of steerable front wheels of the vehicle. A controller is provided to control operation of the two rear steering gears and turning of the steerable rear wheels of the vehicle. A steering apparatus having this construction is disclosed in U.S. Pat. No. 6,945,350.

SUMMARY OF THE INVENTION

The present invention relates to an apparatus for use in turning steerable vehicle wheels upon manual rotation of a steering wheel. The apparatus includes a front steering gear connected with steerable front wheels of the vehicle. The front steering gear is operable to turn the steerable front wheels of the vehicle upon manual rotation of the steering wheel.

A torque sensor is connected with the steering wheel. A controller is connected with the torque sensor. The torque sensor is operable to provide an output upon manual application of force to the steering wheel.

A rear steering gear may be connected with steerable rear wheels of a vehicle. The controller is operable to effect operation of the rear steering gear in response to the output from the torque sensor upon application of at least a predetermined force to the steering wheel. Alternatively or in addition, the controller may be operable to effect operation of a rear wheel brake which is disposed on a radially inner side of a turn in response to an output from the torque sensor upon application of a predetermined force to the steering wheel.

Various features of the invention are disclosed herein in combination with each other. However, it is contemplated that the various features of the invention may be used separately or in different combinations with each other and/or with prior art devices.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS OF THE INVENTION

Figure 1:
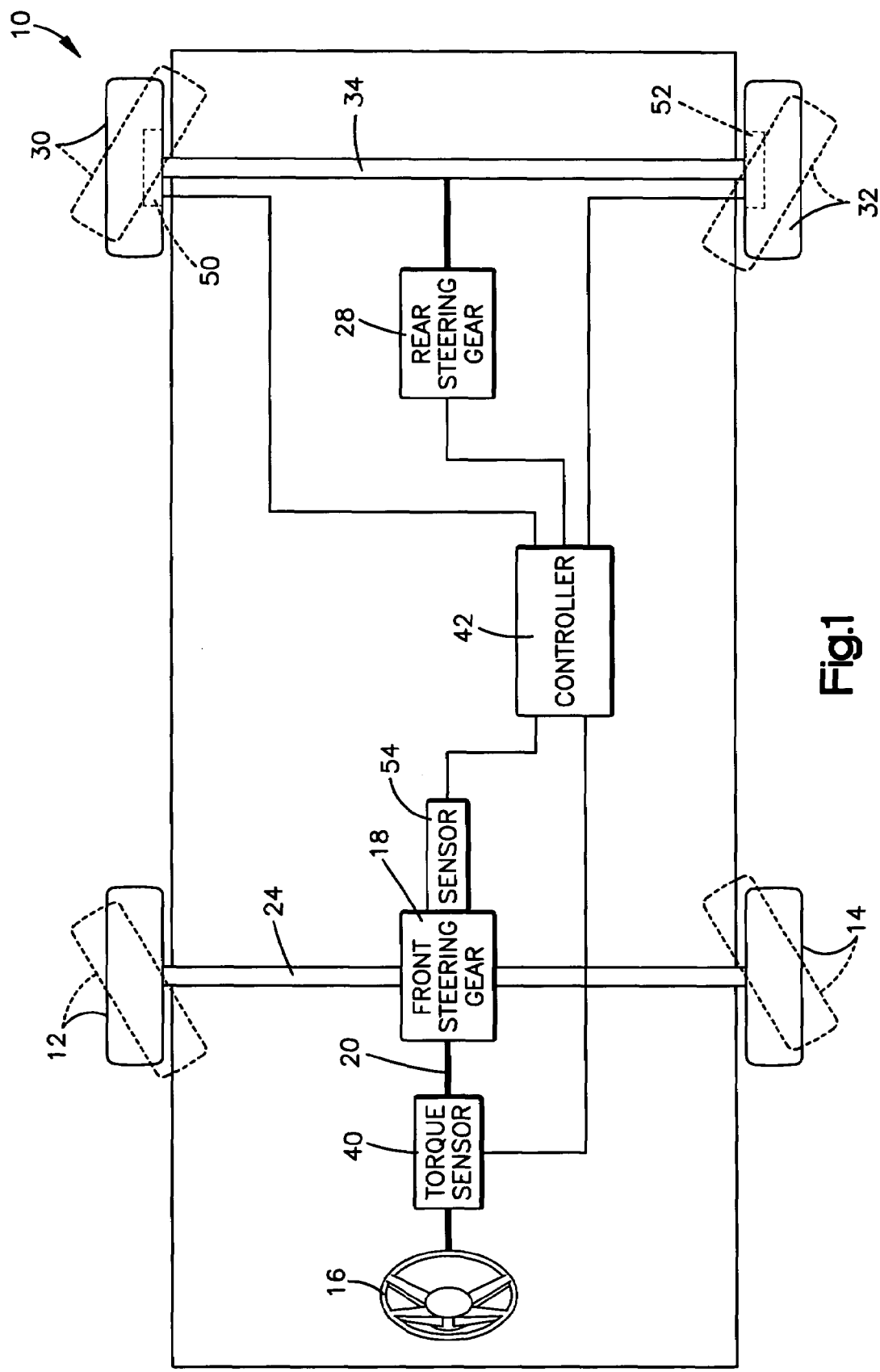
FIG. 1 is a schematic block diagram illustrating a steering apparatus constructed in accordance with the present invention.

A vehicle 10 has steerable front wheels 12 and 14. A steering wheel 16 is connected with a front steering gear 18 by a steering column 20. The front steering gear 18 is connected with the steerable front wheels 12 and 14 by a front steering linkage 24. Upon manual rotation of the steering wheel 16, the front steering gear 18 actuates the front steering linkage 24 to turn the steerable front wheels 12 and 14 of the vehicle 10 in a known manner.

The front steering gear 18 is of the power rack and pinion type. However, the front steering gear 18 may have any other known type of construction. For example, the front steering gear 18 may be of the well known integral type.

A rear steering gear 28 is connected with steerable rear wheels 30 and 32 by a rear steering linkage 34. Operation of the rear steering gear 28 is effective to turn the steerable rear wheels 30 and 32 to decrease the turning radius of the vehicle. The rear steering gear 28 is of the power rack and pinion type. However, the rear steering gear may have any other known type of construction.

If the vehicle 10 is to be turned toward the left (as viewed in FIG. 1), the steering wheel 16 is rotated in a counterclockwise direction by manual application of force to the steering wheel. Rotation of the steering wheel 16 is transmitted through the steering column 20 to the front steering gear 18. The front steering gear 18 actuates the front steering linkage 24 to turn the steerable front wheels 12 and 14 from the straight ahead positions shown in solid lines in FIG. 1 toward the end of turning range positions shown in dashed lines in FIG. 1.

In order to further decrease the turning radius of the vehicle 10, the rear steering gear 28 may be operated to turn the steerable rear wheels 30 and 32 from the straight ahead positions illustrated in solid lines in FIG. 1 toward the end of turning range positions illustrated in dashed lines in FIG. 1. A torque sensor 40 is connected with the steering wheel 16 and with a controller 42. The controller 42 is in turn connected with the rear steering gear 28.

When the output from the torque sensor 40 corresponds to the manual application of at least a predetermined force to the steering wheel 16, the controller 42 is operable to effect operation of the rear steering gear 28. Operation of the rear steering gear 28 operates the rear steering linkage 34 to turn the steerable rear wheels 30 and 32.

During manual rotation of the steering wheel 16 and turning movement of the steerable front wheels 12 and 14, the output from the torque sensor 40 does not effect operation of the controller 42 and rear steering gear 28 to turn the steerable rear wheels 30 and 32 of the vehicle 10. However, when the steerable front wheels 12 and 14 of the vehicle 10 have been turned to the ends of their ranges of turning movement, illustrated in dashed lines in FIG. 1, in response to rotation of the steering wheel 16, the driver of the vehicle will increase the force which is manually applied to the steering wheel. This results in a change in the output from the torque sensor 40 to the controller 42.

In response to the change in the output transmitted from the torque sensor 40 to the controller 42, the controller initiates operation of the rear steering gear 28 to turn the steerable rear wheels 30 and 32 to further decrease the turning radius of the vehicle 10. The controller 42 effects operation of the rear steering gear 28 and rear steering linkage 34 to turn the steerable rear wheels 30 and 32 in a direction which is opposite to the direction in which the steerable front wheels 12 and 14 were turned before they reached their ends of steering range positions.

The steerable rear wheels 30 and 32 are turned when the steerable front wheels 12 and 14 are at the ends of their ranges of turning movement. This results in a sequential turning of first the steerable front wheels 12 and 14 and then the steerable rear wheels 30 and 32. Therefore, the controller 42 effects operation of the rear steering gear 28 to turn the steerable rear wheels 30 and 32 while the front steering gear 18 is ineffective to turn the steerable front wheels 12 and 14 from their end of steering range positions illustrated in dashed lines in FIG. 1. This results in the turning radius of each of the steerable front wheels 12 and 14 remaining constant while the turning radius of each of the steerable rear wheels 30 and 32 changes.

The output from the torque sensor 40 to the controller 42 varies as a function of variations in the force which is manually applied to the steering wheel 16. During normal rotation of the steering wheel 16 to operate the front steering gear 18 and turn the steerable front wheels 12 and 14, the relatively small force which is manually applied to the steering wheel 16 results in an output signal from the torque sensor 40 which does not cause the controller 42 to initiate operation of the rear steering gear 28.

When the steerable front wheels 12 and 14 reach the ends of their ranges of turning movement, the force which is manually applied to the steering wheel 16 increases to at least a predetermined force. Application of the predetermined force to the steering wheel 16 results in an increase in the output signal transmitted from the torque sensor 40 to the controller 42. In the response to the increase in the signal transmitted from the torque sensor 40 to the controller 42, corresponding to at least the predetermined force, the controller initiates operation of the rear steering gear 28 to turn the steerable rear wheels 30 and 32.

In addition to initiating operation of the rear steering gear 28, the controller 42 may also effect operation of a rear wheel brake 50 or 52. In the illustrated embodiment of the invention, the controller 42 effects operation of only the rear wheel brake 50 or 52 which is disposed on a radially inner side of a turn after the rear wheels 30 and 32 have been moved to their end of steering range positions. When the steerable front wheels 12 and 14 and steerable rear wheels 30 and 32 have been turned to their end of steering range positions, shown in dashed lines in FIG. 1, the rear wheel brake 52 which is closest to the center of a curve on which the vehicle 10 is traveling is actuated.

A turning direction sensor 54 is connected with the front steering gear 18 and has an output which is transmitted to the controller 42. The output from the turning direction sensor 54 indicates the direction in which the front wheels 12 and 14 have moved from their straight ahead positions (shown in solid lines in FIG. 1) toward their end of steering range positions (shown in dashed lines in FIG. 1). In response to a predetermined output from the torque sensor 40 and the output from the turning direction sensor 54, the controller 42 actuates the rear wheel brake 52 for the steerable rear wheel 32 while the rear wheel brake 50 for the steerable rear wheel 30 remains in an unactuated condition.

Actuation of the rear wheel brake 52 for the steerable rear wheel 32 results in friction forces between the steerable rear wheel 32 and the road along which the vehicle is traveling tending to turn the vehicle to the inside of the curve along which the vehicle is traveling with a resulting reduction in turning radius. Of course, if the vehicle 10 was turning toward the right, rather than the left, the controller 42 would actuate the rear wheel brake 50 associated with the steerable rear wheel 30 while the rear wheel brake 52 associated with the steerable rear wheel 32 would remain in an unactuated condition.

In the embodiment illustrated in FIG. 1, the turning direction sensor 54 is connected with the front steering gear 18. However, it is contemplated that the turning direction sensor 54 may be connected with one of the front wheels 12 or 14. Alternatively, the steering direction sensor 54 may be connected with the rear steering gear 28 or one of the steerable rear wheels 30 or 32.

Although it may be desired to have the rear brake 50 or 52 on the radially inner side of a turn actuated along with the rear steering gear 28, these two features may be used separately. For example, the rear steering gear 28 may be actuated to the end of the range of turning movement without actuating either one of the rear brakes 50 or 52. Alternatively, the rear steering gear 28 may be omitted and the rear brake 50 or 52 on the radially inner side of a turn may be actuated after the steerable front wheels 12 and 14 have reached the end of their range of turning movement. As another alternative, the rear brake 50 or 52 on the radially inner side of a turn may be actuated before the rear steering gear 28 has moved the steerable rear wheels 30 and 32 to the ends of their ranges of turning movement.

Actuation of the rear brake 50 or 52 on the inside of the turn may be in response to an increase in the output signal from the torque sensor 40 or in response to a rear wheel position sensor sensing turning movement of the steerable rear wheels 30 and 32 to predetermined positions in their range of turning movement. The predetermined positions of the steerable rear wheels 30 and 32 at which the controller 42 initiates actuation of a rear brake 50 or 52 may be when the steerable rear wheels have been turned to intermediate positions in their range of turning movement or have been moved to positions at the ends of their ranges of turning movement.

It should be understood that the rear steering gear 28 may be used either with or without the feature of actuating one of the rear wheel brakes 50 or 52 on the inside of a turn. It should also be understood that the feature of actuating one of the rear wheel brakes 50 or 52 on the inside of a turn may be utilized without the rear steering gear 28. When the feature of actuating the rear wheel brake 50 or 52 on the radially inner side of a turn is utilized in association with the rear steering gear 28, it is believed that it may be desirable to have the controller 42 respond to a first signal from the torque sensor 40 to initiate operation of the rear steering gear 28 in response to the manual application of a first force to the steering wheel 16. Upon manual application of a second, even larger force to the steering wheel 16, a resulting increase in the signal from the torque sensor 40 to the controller 42 would cause the controller 42 to actuate the rear wheel brake 50 or 52 on the inside of the turn.

In the unlikely event of a failure of the front steering gear 18, the resulting increase in the force which is manually applied to the steering wheel 16 results in an increase in the output signal from the torque sensor 40. The increase in the output signal from the torque sensor 40 causes the controller 42 to initiate operation of the rear steering gear 28 even though the front steerable wheels 12 and 14 are not at the ends of their ranges of turning movement. Operation of the rear steering gear 28 actuates the rear steering linkage 34 to turn the steerable rear wheels 30 and 32. Turning of the steerable rear wheels 30 and 32 decreases the turning radius of the vehicle 10 even though the front steering gear 18 is ineffective to turn the steerable front wheels 12 and 14 in the normal manner.

Upon a malfunction of the front steering gear 18, the force which is manually applied to the steering wheel 16 may be effective to manually drive the front steering gear 18 and cause the front steerable vehicle wheels 12 and 14 to turn. By having the controller 42 activate the rear steering gear 28, the steerable rear wheels 30 and 32 are also turned to decrease the turning radius of the vehicle 10. Therefore, even though the front steering gear 18 is malfunctioning, the driver of the vehicle 10 can, with application of a greater than normal manual force to the steering wheel 16, steer the vehicle 10.

It should be understood that if the rear steering gear 28 is omitted, the feature having the radially inner one of the rear wheel brakes 50 or 52 actuated to induce turning movement of the vehicle 10 may be utilized in the unlikely event of a malfunctioning of the front steering gear 18. Alternatively, the controller 40 may effect operation of the rear steering gear 28 to turn the steerable rear wheels 30 and 32 upon movement of the steerable front wheels 12 and 14 to their end of steering range positions and the resulting manual application of a first force to the steering wheel which is larger than the force which is normally applied to the steering wheel during normal turning of the steerable front wheels 12 and 14. In the event that a second force, which is even larger than the first force, is manually applied to the steering wheel, the controller 42 may actuate the rear wheel brake 50 or 52 on the inside of the turn in addition to actuating the rear steering gear 28.

If an operator of a vehicle turns the steerable front wheels 12 and 14 to their end of steering range positions and then applies the first force to the steering wheel 16, the output from the torque sensor 40 would initiate operation of the controller 42 to operate the rear steering gear 28 to turn the steerable rear wheels. This may be done without actuation of the radially inner rear wheel brake 50 or 52 by the controller 42. If the even larger second force is manually applied to the steering wheel 16, the output signal from the torque sensor 40 may cause the controller 42 to actuate rear wheel brake 50 or 52 on the inside of the turn. The relatively large second force would be applied to the steering wheel 16 after the steerable front vehicle wheels 12 and 14 have been turned to their end of steering range positions or upon failure of the front steering gear 18.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels upon manual rotation of a steering wheel, said apparatus comprising:
    a front steering gear connected with steerable front wheels of the vehicle, said front steering gear being operable to turn the steerable front wheels of the vehicle upon manual rotation of the steering wheel;
    a rear steering gear connected with steerable rear wheels of the vehicle;
    a torque sensor connected with the steering wheel; and
    a controller which is connected with said torque sensor and rear steering gear, said controller being operable to effect operation of said rear steering gear in response to an output from said torque sensor upon manual application of at least a predetermined force to the steering wheel, said torque sensor having an output which corresponds to a force which is less than the predetermined force throughout turning of the steerable front wheels through their range of turning movement during normal operation of said front steering gear, said torque sensor having an output which corresponds to a force which is at least as great as the predetermined force which occurs when turning of the steerable front wheels in a direction that cannot be performed, said controller being operable to effect operation of said rear steering gear in response to the output from said torque sensor corresponding to at least the force which occurs when turning of the steerable front wheels in the direction that cannot be performed.

2. An apparatus as set forth in claim 1 wherein said torque sensor has an output which corresponds to a force which is at least as great as the predetermined force after the steerable front wheels reach an end of their range of turning movement.

3. An apparatus as set forth in claim 1 wherein said torque sensor has an output which corresponds to a force which is at least as great as the predetermined force upon a failure of the front steering gear.

4. An apparatus as set forth in claim 1 wherein said controller is connected with brakes for the steerable rear wheels of the vehicle, said controller being operable to effect operation of a brake associated with a rear wheel on a radially inner side of a turn when said torque sensor has an output which corresponds to a force which is at least as great as the predetermined force.

5. An apparatus as set forth in claim 1 wherein said controller effects operation of said rear steering gear to turn the steerable rear wheels of the vehicle and change a turning radius of each of the steerable rear wheels of the vehicle while said front steering gear is ineffective to turn the steerable front wheels of the vehicle and a turning radius of each of the steerable front wheels of the vehicle remains constant.

6. An apparatus as set forth in claim 1 wherein said torque sensor has an output which corresponds to a force which is at least as great as the predetermined force after the steerable front wheels reach an end of their range of turning movement and at least the predetermined force is applied to the steering wheel.

7. An apparatus for use in turning steerable vehicle wheels upon manual rotation of a steering wheel, said apparatus comprising:
    a front steering gear connected with steerable front wheels of the vehicle, said front steering gear being operable to turn the steerable front wheels of the vehicle upon manual rotation of the steering wheel;
    first and second brakes associated with rear wheels of the vehicle;
    a torque sensor connected with the steering wheel; and
    a controller which is connected with said torque sensor and with said first and second brakes, said controller being operable to effect operation of one of said first and second brakes which is disposed on a radially inner side of a turn in response to an output from said torque sensor upon manual application of at least a predetermined force to the steering wheel, said torque sensor has an output which corresponds to a force which is less than the predetermined force throughout turning of the steerable front wheels through their range of turning movement during normal operation of said front steering gear, said torque sensor has an output which corresponds to a force which is at least as great as the predetermined force which occurs when turning of the steerable front wheels in a direction that cannot be performed, said controller being operable to effect operation of one of said first and second brakes which is disposed on a radially inner side of a turn in response to the output from said torque sensor corresponding to at least the force which occurs when turning of the steerable front wheels in the direction that cannot be performed.

8. An apparatus as set forth in claim 7 wherein said torque sensor has an output which corresponds to a force which is at least as great as the predetermined force after the steerable front wheels reach an end of their range of turning movement and at least the predetermined force is applied to the steering wheel.

9. An application as set forth in claim 7 wherein said torque sensor has an output which corresponds to a force which is at least as great as the predetermined force upon a failure of the front steering gear.

10. An apparatus as set forth in claim 7 further including a rear steering gear connected with the rear wheels of the vehicle, said controller being operable to effect operation of said rear steering gear in response to an output from said torque sensor which corresponds to a force which is less than the predetermined force.

11. An apparatus as set forth in claim 10 wherein said controller effects operation of said rear steering gear to turn the rear wheels of the vehicle and change a turning radius of each of the rear wheels of the vehicle while said front steering gear is ineffective to turn the steerable front wheels of the vehicle and a turning radius of each of the steerable front wheels of the vehicle remains constant.

12. An apparatus for use in turning steerable vehicle wheels upon manual rotation of a steering wheel, said apparatus comprising:
a front steering gear connected with steerable front wheels of the vehicle, said front steering gear being operable to turn the steerable front wheels of the vehicle upon manual rotation of the steering wheel;
a rear steering gear connected with first and second steerable rear wheels of the vehicle:
a first brake associated with the first steerable rear wheel of the vehicle;
a second brake associated with the second steerable rear wheel of the vehicle;
a torgue sensor connected with the steering wheel; and
a controller which is connected with said torgue sensor, with said rear steering gear, and with said first and second bakes, said controller being operable to effect operation of said rear steering aear in response to an output from said torque sensor corresponding to manual application of at least a first predetermined force to the steering wheel, said controller being operable to effect operation of one of said first and second brakes which is disposed on a radially inner side of a turn in response to an output from said torque sensor corresponding to manual application of at least a second predetermined force to the steering wheel, said controller effecting operation of said rear steering gear to turn the steerable rear wheels of the vehicle and change a turning radius of each of the steerable rear wheels of the vehicle while said front steering gear is ineffective to turn the steerable front wheels of the vehicle and a turning radius of each of the steerable front wheels of the vehicle remains constant.

13. An apparatus as set forth in claim 12 wherein said controller effects operation the one of said first and second brakes which is disposed on a radially inner side of a turn while said front steering gear is ineffective to turn steerable front wheels of the vehicle and a turning radius of each of the steerable front wheels of the vehicle remains constant.

14. An apparatus for use in turning steerable vehicle wheels upon manual rotation of a steering wheel, said apparatus comprising:
a front steering gear connected with steerable front wheels of the vehicle, said front steering gear being operable to turn the steerable front wheels of the vehicle upon manual rotation of the steering wheel;
a rear steering gear connected with first and second steerable rear wheels of the vehicle;
a first brake associated with the first steerable rear wheel of the vehicle;
a second brake associated with the second steerable rear wheel of the vehicle;
a torgue sensor connected with the steering wheel; and
a controller which is connected with said torgue sensor, with said rear steering gear, and with said first and second bakes, said controller being operable to effect operation of said rear steering gear in response to an output from said torgue sensor corresponding to manual application of at least a first predetermined force to the steering wheel, said controller being operable to effect operation of one of said first and second brakes which is disposed on a radially inner side of a turn in response to an output from said torque sensor corresponding to manual application of at least a second predetermined force to the steering wheel, said torque sensor having an output which corresponds to a force which is less than the first predetermined force throughout turning of the steerable front wheels through their range of turning movement during normal operation of said front steering gear, said torque sensor having an output which corresponds to a force which is at least as great as the first predetermined force which occurs when turning of the steerable front wheels in a direction that cannot be performed, said controller being operable to effect operation of said rear steering gear in response to the output from said torque sensor corresponding to at least the force which occurs when turning of the steerable front wheels in the direction that cannot be performed.

15. An apparatus for use in turning steerable vehicle wheels upon manual rotation of a steering wheel, said apparatus comprising:
a front steering gear connected with steerable front wheels of the vehicle, said front steering gear being operable to turn the steerable front wheels of the vehicle upon manual rotation of the steering wheel;
a rear steering gear connected with first and second steerable rear wheels of the vehicle;
a first brake associated with the first steerable rear wheel of the vehicle;
a second brake associated with the second steerable rear wheel of the vehicle;
a torque sensor connected with the steering wheel; and
a controller which is connected with said torgue sensor, with said rear steering gear, and with said first and second bakes, said controller being operable to effect operation of said rear steering gear in response to an output from said torgue sensor corresponding to manual application of at least a first predetermined force to the steering wheel, said controller being operable to effect operation of one of said first and second brakes which is disposed on a radially inner side of a turn in response to an output from said torgue sensor corresponding to manual application of at least a second predetermined force to the steering wheel, said torque sensor having an output which corresponds to a force which is less than the second predetermined force throughout turning of the steerable rear wheels through their range of turning movement during normal operation of said rear steering gear, said torque sensor having an output which corresponds to a force which is at least as great as the second predetermined force which occurs when turning of the steerable rear wheels in a direction that cannot be performed, said controller being operable to effect operation of one of said first and second brakes which is disposed on a radially inner side of a turn in response to the output from said torque sensor corresponding to at least the force which occurs when turning of the steerable rear wheels in the direction that cannot be performed.

* * * * *

UNITED STATES PATENT AND TRADEMARK OFFICE
CERTIFICATE OF CORRECTION

PATENT NO. : 7,575,089 B2  Page 1 of 1
APPLICATION NO. : 11/293429
DATED : August 18, 2009
INVENTOR(S) : Kenneth A. Sherwin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Seventh Day of September, 2010

David J. Kappos
*Director of the United States Patent and Trademark Office*